Jan. 28, 1969        A. WIRTH ET AL        3,423,999
COMBINED ELECTRONIC MASS AND FORCE METER
Filed Oct. 20, 1965                              Sheet 1 of 2
FIG. 1
FIG. 5
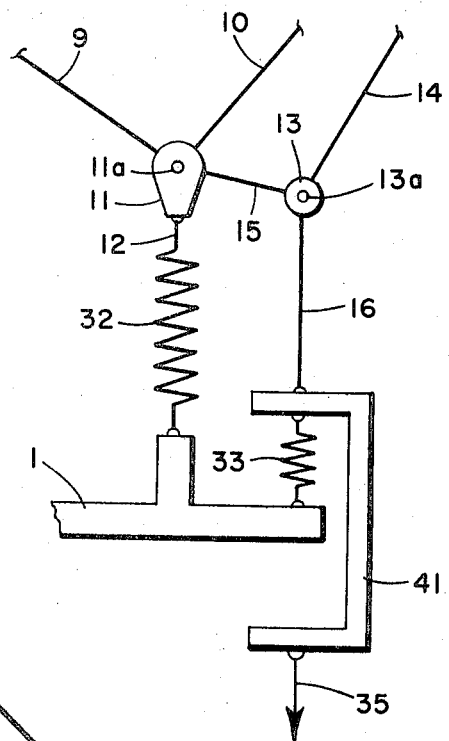
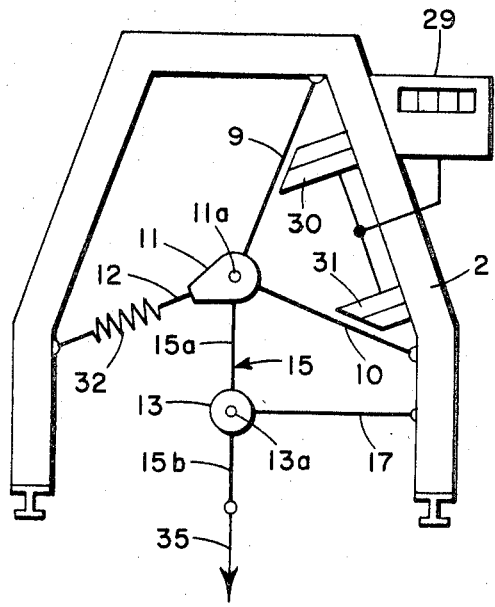
FIG. 2
INVENTORS
ARMIN WIRTH,
JOHANNES WIRTH,
MARIO GALLO
BY *Stevens, Davis, Miller & Mosher*
ATTORNEYS

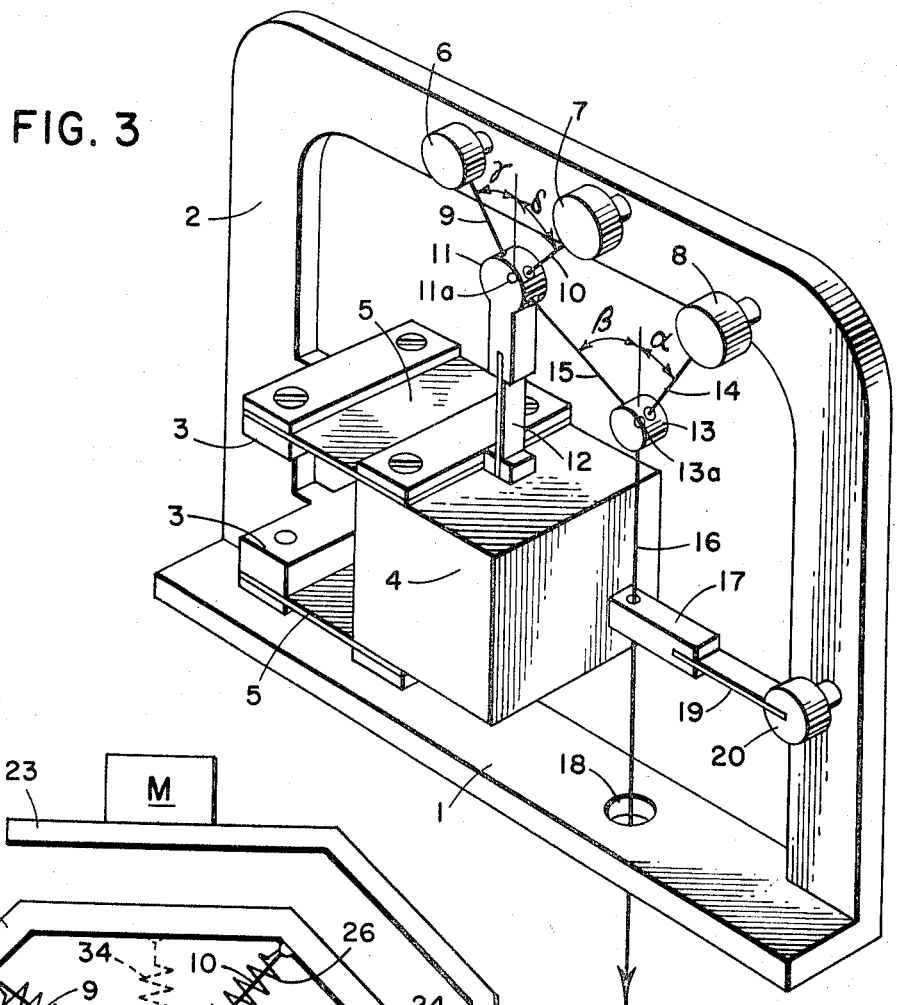

United States Patent Office 3,423,999
Patented Jan. 28, 1969

3,423,999
COMBINED ELECTRONIC MASS AND FORCE METER
Armin Wirth, Johannes Wirth, and Mario Gallo, Zurich, Switzerland, assignors to Wirth, Gallo & Co., Zurich, Switzerland
Filed Oct. 20, 1965, Ser. No. 498,251
Claims priority, application Switzerland, Nov. 27, 1964, 15,393
U.S. Cl. 73—141
Int. Cl. G01l 5/22
13 Claims

ABSTRACT OF THE DISCLOSURE

An instrument for measuring masses and forces in which the load that is to be measured acts indirectly on the tension of two electronically excited, transversely vibrating, pre-tensioned strings. The resultant frequency change in these strings is used in an evaluating device to calculate and indicate the magnitude of the measured load. Two transmission elements apply to the respective strings a pre-tensioning force and a force depending on the load to be measured. The transmission elements and strings are connected to radiate from a central point in the form of a star so that the distribution of the forces between the two strings is at least approximately determined by their directions.

---

The present invention relates to an electronic instrument for measuring loads, associated with a digital evaluating device, in which the quantity that is to be measured—such as a mass or a force—acts indirectly upon the mechanical tension of two electronically excited transversely vibrating pretensioned strings, the resultant change in the frequency of vibration being used in the evaluating device for calculating and indicating the measured quantity.

Measuring instruments of this type have already been proposed, for instance in French Patent 1,125,037. Subject to certain qualifications the instrument there described may also be used as a balance in which case the weight of a load resting on a tray is measured. Means for exciting and sensing the vibrations of vibrating strings have also been described, for instance, in Swiss Patent 404,736 issued Dec. 31, 1965. Finally evaluating devices are known which can be used for calculating and indicating the measured load. A device of this latter kind has been described in Swiss Patent 405,743 issued Jan. 15, 1966. Furthermore, measuring devices are already known in which the load to be measured, as well as a reference load of known magnitude, both act upon two vibrating strings. A lever connected to the strings and to both loads acts as a distribution element determining the ratio of action of each load on each string. The instrument, according to the present invention, is an improvement over these known devices. The invention is characterized by first and second transmission elements transmitting respectively a pretensioning load and a load proportional to the load that is to be measured and by a central body to which the ends of the strings and the ends of the transmission elements are fixed, so that the distribution of the loads on the two strings is determined by their directions.

In the inventive construction both loads act upon the strings and the load proportional to the load to be measured always remains proportional to this load independently of its magnitude over the full measurement range. The central body, to which the strings and two elements transmitting the reference load and the load to be measured are attached in the form of a star, is very small compared with the lever of the prior art, which has relatively high inertia. A further advantage of this construction is to reduce the pretensioning load and the tare to the smallest number of elements. The inventive device is practically insensitive to rotational vibrations. It would be impossible to achieve this with a distribution lever, which by its very nature cannot be parallely guided. In order to reach the same effect with such a lever, very complicated compensation devices would have to be provided. Besides the technical difficulties in designing and manufacturing such devices, their resultant price would make this solution not too practical. The inventive star-like arrangement of the strings and of the two transmission elements around the central body allows for an extremely easy adjustment of the distribution of the two loads on the strings, as their ratio depends on the relative directions of these four parts only.

Embodiments of the invention are schematically shown in the accompanying drawings in which FIG. 1 is a schematic representation of the instrument according to the invention;

FIG. 2 is schematic representation of an instrument for measuring a load;

FIG. 3 is a perspective view of the mechanical elements of the device illustrated in FIG. 2, the electronic system not being shown in detail;

FIG. 4 is a schematic representation of a variation of FIG. 2 for use as a device that is not affected by accelerational forces; and FIG. 5 is a schematic representation of a modification of the embodiment according to FIG. 2 for use as an instrument for measuring loads.

FIG. 1 schematically illustrates an instrument for measuring loads. One end of each of two vibratory strings 9 and 10 is attached to a frame 2, the other ends being fastened to a member 11 which is common to both. The frame may either be bolted at the top to support or, as illusrated, it may stand on a base. A spring 32 is stretched between frame 2 and member 11. The load 35 that is to be measured is applied to member 11 by a transmission element 15 made of two parts 15a and 15b. A further member 13, having a central point 13a, and a radius rod 17 serve to ensure independence of the transmission element 15 between member 13 and member 11 from minor changes in the direction of the applied load 35. The strings 9, 10, the transmission element 15 and spring 32 form a star, i.e., their geometrical axes intersect at least approximately at a point 11a. In this embodiment it is assumed that the load 35 is an exclusively tensile force so that, as distinct from embodiments yet to be described, the transmission element 15 need not be subjected to a biasing tension. As will also be hereinafter described, the input load 35 and the transmission element 15 may be arranged to act in a different direction in such manner that the transmission provides a reduction ratio.

An evaluating device 29 of known construction is mounted on frame 2. The exciting and sensing heads 30 and 31 are located adjacent the strings 9 and 10 in a manner known in the art. The signals from the sensors are applied to the input of the evaluating device which is adapted to indicate the magnitude of the input load 35 in digital form. At the same time a quantity that is proportional thereto, such as a price, may likewise be indicated.

FIG. 2 schematically illustrates the several components of an electronic instrument for measuring loads. The frame 2 consists of a baseplate 1 and a C-bracket. The bracket carries the two strings 9 and 10 which at their bottom are attached to the central member 11. A pretensioning weight 4 is suspended by means of an element 12 in tension from the central member 11. Parallel radius rods 5 hinged at points 3 guide the weight 4 vertically within the bracket. A polygon of forces for transmitting the load due to the weight of the body that is to be measured is formed by the elements 14, 15 and 16. The produced axes of these elements all intersect at least approximately at point 13a on member 13. The produced axes of the two strings 9 and 10, of the transmission element 15 and of the pre-tension transmitting element 12 all intersect approximately at point 11a. An arm 21 on a carrier plate 23 supporting the weight M being measured is vertically guided by radius rods 22 hinged to bracket 2 at the four points 24 and it is suspended from the measuring system by being attached to the bottom end of element 16 of the string polygon. The load transmitted by element 15, when the weight M is O, in conjunction with the weight 4 provide the load which pre-tensions the two strings 9 and 10. In order to make the instrument, when measuring weights, independent of any angle of tilt, it is important that the guide means of the biasing weight (weight 4) and of the carrier plate 23 should be exactly parallel. The direction of motion in relation to the true vertical is not important. An evaluating device 29, of conventional form of construction, is affixed to frame 2. Exciting and sensing heads 30 and 31 are located adjacent the strings 9 and 10 in a manner that is likewise conventional. The signals induced in the heads are applied to the evaluating device which indicates the weight M of the body on the carrier directly in digital form. At the same time a quantity proportional to this indication, such as a price, may likewise be indicated.

In the embodiment according to FIG. 3 the exciting and sensing heads for the strings, as well as the evaluating device and the carrier, have been omitted for the sake of clarity. The frame of the instrument for measuring loads comprises a baseplate 1 and a hoop shaped frame 2. On the left hand side of the hoop shaped frame are two clamping heads 3 to which a weight 4 is attached by leaf springs 5 in such a way that the weight is constrained to move substantially in the vertical direction. The horizontal portion of the hoop shaped frame 2 is provided with three more clamping heads 6, 7 and 8. A string 9 is rigidly fixed in clamping head 6 and a string 10 is rigidly fixed in clamping head 7. Known means which are not specially shown permit the clamping heads 6, 7 and 8 to be displaced and locked in the vertical plane of the system for adjusting the angles between the vibratory strings and the transmission polygon. The bottom ends of the vibratory strings 9 and 10 are fastened to a central member 11. A leaf spring 12 connects the bottom of the central member 11 to weight 4, so that the latter can move vertically only to the extent permitted by the position of the central member 11. The mass of member 11 should be sufficiently small not to change the tension of the strings 9 and 10 when the system is canted or subjected to horizontal vibrations. On the other hand, its mass should be large enough to prevent mutual interference between the vibrating strings.

Moreover, transmission element 15 and element 16 are connected to element 14 by a member 13. Element 16 extends through a radius rod 17 and a hole 18 in the baseplate 1, the carrier 23 (not shown in FIG. 3) being directly suspended from the bottom end of element 16 as described with reference to FIG. 1. Radius rod 17 is attached by a leaf spring 19 to a clamping head 20 on the hoop shaped frame 2. This radius rod 17 serves to make the transmission ratio of the polygon formed by transmission elements 14, 15 and 16 to the strings 9 and 10 independent of slight horizontal displacements of the point of attack of the load at the bottom end of element 16. The three elements 14, 15 and 16 of the polygon may consist of wires or ribbons.

The magnitude of the load which acts through transmission element 15 on the central member 11, i.e., the reduction ratio achieved, is adjusted by a suitable choice of the angles $\alpha\beta$ between elements 14, 15 and the direction of element 16. As already mentioned, this can be done by adjustably moving the clamping head 8.

Conveniently the strings 9, 10 and the elements 14, 15, 16 are all contained in the same vertical plane in which the weight 4 also has its single degree of freedom. If the produced axis of the transmission element 15 is outside the angle $(\gamma+\delta)$ between the two strings 9 and 10 then load transmitted through element 15 will increase the tension of string 9 and decrease that of string 10. For the convenience of specific evaluating formulae the tensions of the strings in such a case are preferably arranged to change in the proportion of 3:—1 or 1:—3. If the produced axis of the transmission element 15 is inside the said angle, then the tension of both strings 9 and 10 will be increased. The angles formed by the strings in relations to the direction of the pre-tensioning element in the form of leaf spring 12 can be adjusted, for instance, by appropriately adjusting the position of the clamping heads 6 and 7.

The deflecting effect due to elements 14, 15, 16 serves for transmitting the measured load to member 11 with a suitable transmission ratio. Lengthwise the elements should be sufficiently hard to ensure that the longitudinal resonant frequencies of the elastic system constituted by these elements, and the loads with which it is coupled, are much higher (for instance in the proportion of 100:1) than the reciprocal of the measuring time, but lower than the transverse frequencies of the strings 9 and 10. Consequently the load that is to be measured and weight 4 will vibrate both in relation to one another and to the casing within a wide low-frequency range with the same phase and amplitude. Vertical vibrations of the instrument will not thus affect the weighing operations. Owing to the relative smallness and the concentration of the mass of these elements in the central member 11 and in member 13, the inertial effects of these elements are quite negligible. The entire instrument is therefore also substantially unaffected by horizontal vibrations. Finally, the carrier which supports the measured load is located vertically above the central member 11 so that the instrument is also substantially insensitive to torsional vibrations.

According to the contemplated application the vibrating strings 9 and 10 will be more or less stiff. In some cases of major practical importance—for example if the two frequencies of the strings are to be high and the bias due to weight 4 also high—the use of stiff springs is hardly avoidable. The stiffness of the springs first and foremost raises the resonant frequency at a given tension in relation to that of an ideally elastic string, but this is of no practical importance. Further, the relationship between the frequency ratio and the measured load is likewise changed. However, it is known that a small change in the distribution of the tension due to element 15 between the two strings 9 and 10 permits the characteristics of the device to be kept as linear as in the ideal case of infinitely long flexible strings.

A weighing instrument with stiff springs functions to some extent as dynamometer, because the frequency of the strings is determined by the sum of a real external tension that is proportional to an acceleration and supplementary load due to this stiffness which is largely independent of acceleration. When the strings have two fixed ends this supplementary load is a function of the external tension because the nature of the vibration of such a string varies with the tension. In many practical cases the relative change of this supplementary load (within the range of external tensions) is small, so that it can be readily compensated by a constant spring force.

FIG. 4 schematically illustrates two further embodiments. The elements which correspond to elements shown in the other figures bear the same reference numbers. The above mentioned supplementary load due to the stiffness of the strings may be compensated, for instance, by two tension springs 25 and 26 operating in parallel with the two strings 9 and 10 (FIG. 4) and having the effect of reducing the tensile forces acting on the strings. The same effect as that achieved by the two springs 25 and 26 can also be achieved by one single tension spring 34 (shown in dotted outline) or by two springs 27, 28—for instance in the form of longitudinally loaded leaf springs—acting on the biasing weight 4 and the carrier arm 21. If the tension of string 15 at no load, i.e., when the carrier 23 carries no weight, is very small, then spring 28 can be dispensed with.

A very similar arrangement can also be used for measuring loads as illustrated in FIG. 5. The load that is to be measured is transmitted to element 16 through a stirrup 41. Moreover, the two measuring strings are biased by spring means. The biasing weight 4 (FIG. 2) is replaced by the tension spring 32 (FIG. 5). For biasing the polygon 14, 15, 16 a supplementary spring 33 is required. Hence, the pre-tension of the strings 9 and 10 is again determined by two elements, and the proportion of the pre-tension supplied by the tension spring 32 may be, say, ten times greater than that due to spring 33. In every case the resultant of these two loads passes through point 11a. The stiffness of the strings does no harm and compensating springs such as 25, 26, 27, 28 (FIG. 4) are not needed.

If the described instruments, when used for measuring loads, are to provide indications that are unaffected by accelerations, then the masses of elements 11, 13 and 21 should be negligibly small or they should be compensated by opposed moving masses in a manner that is well understood.

Instruments for measuring loads should preferably be constructed of hard elastic materials. The radius rods 5 and 22 for guiding the pre-tensioning weight 4 and the carrier arm 21 should be free from backlash and their elasticity should be limited, requirements which can be preferably fulfilled by using two radius rods in the form of leaf springs or by using radius rods in which the hinges are constituted by flexible springs at their ends.

Preferably the strings 9 and 10 are decoupled from their environment within the frequency range of their transverse vibrations. The clamping heads 6 and 7 and the central member 11 are contrived to constitute mechanical low-pass filters having a cut-off frequency which is much lower (for instance in the proportion of 1:10) than the resonant frequency of the strings. This can be done, for instance, by correctly selecting the mass of the clamping heads and of the stems which carry them.

The system should not contain highly resonant vibratory systems, a requirement which can be fulfilled by providing internal damping means (not shown) in weight 4 and in the carrier arm 21 and the carrier 23 or by damping the said elements in relation to the baseplate 1.

Finally, instruments for measuring loads can be contrived in which the external load (either directly or via transmissions) is not applied to the central member 11 in the form of a pull, as described by reference to the illustrated examples, but in the form of a thrust. In the latter case the transmission element 15 must have the form of a link rod instead of an element loaded for tension, and the elements 14, 16 for applying the load that is to be measured to the rod must also be appropriately constructed in some alternative way.

We claim:
1. An instrument for measuring loads comprising a frame having a baseplate, digital evaluation means mounted on said frame, two electronically excited, transversely vibrating pre-tensioned strings each having one end thereof fixed to said frame, a central body, the other ends of said strings being connected to said central body, first and second transmission elements from transmitting to said strings a pre-tensioning force and a force proportional to the load to be measured respectively, one end of each of said transmission elements being fixed to said central body so that the distribution of said forces to the two strings is determined by the radial direction of said strings from said central body, the other ends of said transmission elements being operatively connected to receive their respective forces, and means for applying to the evaluation means resultant frequency variations caused by the application of said loads to said strings for computation and indication of the magnitude of the measured load.

2. An instrument according to claim 1 further comprising a radius rod acting on the second transmission element at a point between the point of attachment of said second transmission element to the central body and the point of application of the load, said radius rod determining the direction of movement of said second transmission element.

3. An instrument according to claim 1 further comprising a connecting body to which the end of the second transmission element opposite the central body is fixed, a wire fixed between the frame and the connecting body, and a third transmission element connecting the load to be measured with said connecting body.

4. An instrument according to claim 3 further comprising a radius rod mounted between the frame and said third transmission element and determining the direction of movement of the latter.

5. An instrument according to claim 3 further comprising a clamping head adjustably fixed to the frame and by means of which said wire is adjustably fixed to the frame so that the transmission ratio of the load on the central body and the distribution of the load on the two strings is adjustable.

6. An instrument according to claim 3 further comprising a carrier plate, an arm carrying said carrier plate, guide means having one end pivotally connected to said frame and the other end pivotally connected to said arm to guide said arm so that said carrier plate has only lineal movement substantially without lateral deviation, and said third transmission element is connected to said arm.

7. An instrument according to claim 6 further comprising a pre-tensioning weight connected by said first transmission means to the central body which together with the weight of said arm and of said carrier plate, provide for the pre-tension of the strings.

8. An instrument according to claim 7 further comprising a first compensation spring mounted between the baseplate and the pre-tensioning weight and by a second compensation spring mounted between said baseplate and said arm.

9. An instrument according to claim 7, further comprising guide means for the pre-tensioning weight whereby the motion of said weight and that of the carrier plate are parallel.

10. An instrument according to claim 3 further comprising a first spring fixed on one end to the frame and on the other end to said first transmission means and by a second spring fixed between the frame and the third transmission element, said spring providing for pre-tensioning of the strings.

11. An instrument according to claim 3 further comprising compensation springs mounted parallely to the strings between the frame and the central body.

12. An instrument according to claim 3 further comprising a single compensation spring mounted between the frame and the central body.

13. An instrument according to claim 1 further comprising a plurality of clamping heads adjustably fixed to the frame, the ends of the strings opposite the ends attached to said central body being fixed to said clamping heads, said strings, said clamping heads, and said central body together form a vibrating system in which the resonant frequency is lower than the lowest possible frequency of said strings.

References Cited

UNITED STATES PATENTS

| 2,854,581 | 9/1958 | Scarrott | 73—517 |
| 2,968,943 | 1/1961 | Statham | 73—141 |
| 3,067,615 | 12/1962 | Holmes | 73—88.5 |
| 3,098,388 | 7/1963 | Appleton | 73—398 |

RICHARD C. QUEISSER, *Primary Examiner.*

CHARLES A. RUEHL, *Assistant Examiner.*